United States Patent [19]

Faroudja

[11] Patent Number: 4,893,176
[45] Date of Patent: Jan. 9, 1990

[54] ADAPTIVE COMB FILTER FOR QUADRATURE MODULATED COLOR TELEVISION SYSTEMS

[76] Inventor: Yves C. Faroudja, 26595 Anacapa Dr., Los Altos Hills, Calif. 94022

[21] Appl. No.: 193,230

[22] Filed: May 11, 1988

Related U.S. Application Data

[63] Continuation of Ser. No. 87,614, Aug. 20, 1987, abandoned, which is a continuation of Ser. No. 785,880, Oct. 9, 1985, abandoned.

[51] Int. Cl.$^4$ .................. H04N 9/78; H04N 11/14
[52] U.S. Cl. .................................. 358/31; 358/16
[58] Field of Search ............................. 358/31, 16

[56] References Cited

U.S. PATENT DOCUMENTS

| | | | |
|---|---|---|---|
| 3,743,766 | 7/1973 | Loose et al. | 358/37 |
| 3,872,498 | 3/1975 | Pritchard | 358/31 |
| 4,345,268 | 8/1982 | Clarke | 358/31 |
| 4,476,484 | 10/1984 | Haskell | 358/11 |
| 4,567,508 | 1/1986 | Hulyer | 358/11 |
| 4,597,007 | 6/1986 | Reitmeier et al. | 358/31 |
| 4,683,490 | 7/1987 | Strolle et al. | 358/31 |

FOREIGN PATENT DOCUMENTS

| | | | |
|---|---|---|---|
| 140828 | 1/1979 | Japan | 358/31 |
| 2079091 | 1/1980 | Japan | 358/31 |
| 123280 | 9/1980 | Japan | 358/31 |
| 171386 | 9/1984 | Japan | 358/31 |
| 2072991 | 10/1981 | United Kingdom | 358/329 |

OTHER PUBLICATIONS

R. Turner, Some Thoughts on Using Comb Filters in the Broadcast Television Transmitter and at the Receiver, IEEE Transactions on Consumer Electronics, vol. CE-23, No. 3, Aug. 1977.

Primary Examiner—John W. Shepperd
Attorney, Agent, or Firm—David B. Harrison

[57] ABSTRACT

A method for processing a quadrature modulated color television picture signal including a luminance component and a chrominance component to reduce cross-color and cross-luminance artificacts in a resultant signal includes in an encoding process the steps of: comb filtering the quadrature modulated chrominance component in a comb filter structure wherein a number of delays between 2 and 13 is adaptively determined by overlap between chrominance and luminance, and the delay is a predetermined one of line scan period, frame scan period, and frame/line scan periods, to put out a comb filtered chroma component; processing the luminance component by passing the luminance component through two complementary filters both symmetrically centered about a chrominance component subcarrier frequency, one filter comprising a band pass filter and the other filter comprising a band reject filter; comb filtering the luminance signal passing through the band pass filter in a comb filter structure wherein a number of delays between 2 and 13 is adaptively determined by overlap between chrominance and luminance, and the delay is the same predetermined one of line scan period, frame scan period, and frame/line scan periods to produce a comb filtered high frequency luminance signal; and adding in phase the comb filtered high frequency luminance signal and the signal passing through the band reject filter in order to provide a comb filtered full bandwidth luminance signal; and, combining in phase the comb filtered chroma component and the comb filtered full bandwidth luminance signal in order to put out a composite signal for transmission or recording. Comb filter decoding having fixed delays are advantageously employed within a system of the present invention.

5 Claims, 12 Drawing Sheets

TYPICAL QUADRATURE MODULATED
COLOR TELEVISION SPECTRUM (NTSC)

TYPICAL NTSC ENCODER

CHROMA/LUMINANCE SPECTRUM IN
THE VICINITY OF THE SUBCARRIER

IMPROVED ENCODER

2H LUMINANCE COMB FILTER

2H CHROMA COMB FILTER

NH ENCODE-DECODE PROCESS

2H DECODER COMB FILTER

6H COMB FILTER STRUCTURE

DIFFERENT COMB FILTER AND Y/C SPECTRAL
OVERLAP CONFIGURATIONS IN ENCODER

REDUCTION IN CROSS-COLOR AND CROSS-LUMINANCE LEVELS AT THE OUTPUT OF A 2H – COMB DECODER WITH DIFFERENT COMB FILTERS CONFIGURATIONS

CROSS-Y AND CROSS-C LEVELS REDUCTIONS AT THE OUTPUT OF A 1H — COMB DECODER WITH DIFFERENT ENCODER COMB FILTERS CONFIGURATIONS

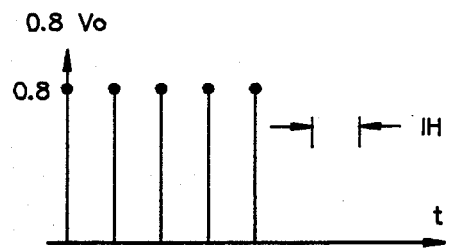
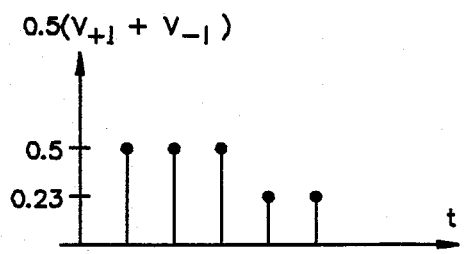
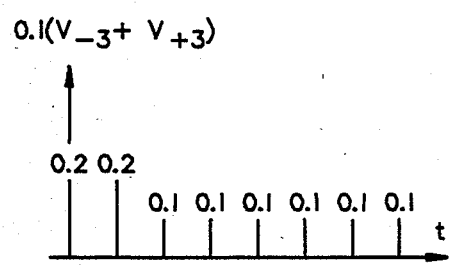
PRESHOT,
OVERSHOT = $\frac{0.1}{1.6}$ = 62%
RISE TIME = 2H
(320ns EQUIV. HORIZ. FREQ.)
ENCODER + 2H DECODER
RISE TIME = 3H = 480ns
EQUIV. HORIZ. FREQ.
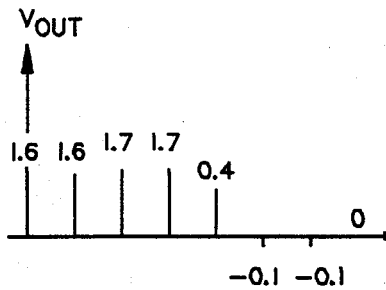
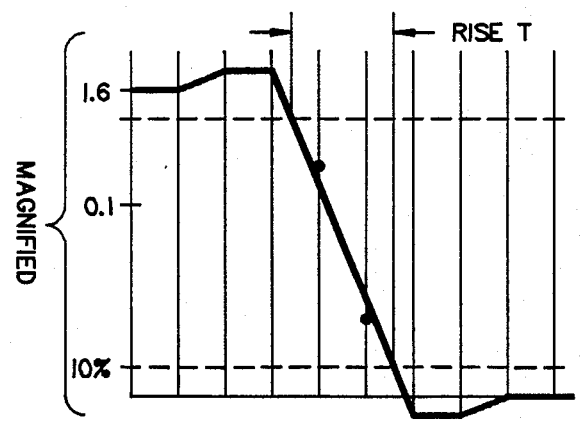
FIG. 8
CHROMA VERTICAL TRANSITIONS

VERTICAL →

| SCANNING LINE: | a | b | c | d | e | f | g | h | i | j | k | l |
|---|---|---|---|---|---|---|---|---|---|---|---|---|
| $V_0 \times 0.8$ | 1.6 | 1.6 | 1.7 | 1.7 | 1.2 | 0.4 | -0.1 | -0.1 | 0 | | | |
| $(V_1) \times 0.5$ | 1.28 | 1.28 | 1.36 | 1.36 | 0.96 | 0.32 | -0.08 | -0.08 | 0 | | | |
| $(V_3) \times -0.1$ | 0.8 | 0.8 | 0.85 | 0.85 | 0.6 | 0.2 | -0.05 | -0.05 | 0 | | | |
| $V_{+1}$ | -0.16 | -0.16 | -0.17 | -0.17 | -0.12 | -0.04 | +0.01 | +0.01 | 0 | 0 | | |
| $V_{-1}$ | 0.8 | 0.85 | 0.85 | 0.6 | 0.2 | -0.05 | 0 | 0 | 0 | 0 | | |
| $0.5(V_{+1} + V_{-1})$ | 0.8 | 0.8 | 0.8 | 0.85 | 0.85 | 0.6 | -0.05 | -0.05 | -0.05 | 0 | | |
| | 1.6 | 1.65 | 1.65 | 1.45 | 0.85 | 0.55 | 0.2 | -0.05 | -0.05 | | | |
| $(V_3) \times -0.1$ | -0.16 | -0.16 | -0.17 | -0.17 | 1.05 | -0.04 | 0.15 | -0.05 | -0.05 | 0 | | |
| $V_{+3}$ | -0.16 | -0.16 | -0.17 | -0.17 | -0.19 | -0.04 | +0.01 | +0.01 | 0 | 0 | 0 | 0 |
| $V_{-3}$ | -0.16 | -0.12 | -0.04 | +0.01 | -0.16 | 0 | 0 | 0 | 0 | 0 | 0 | 0 |
| $(V_{+3} + V_{-3})$ | -0.16 | -0.16 | -0.16 | -0.16 | -0.16 | -0.17 | -0.17 | -0.12 | -0.04 | +0.01 | +0.01 | 0 |
| | -0.32 | -0.28 | -0.2 | -0.15 | -0.15 | -0.17 | -0.17 | -0.12 | -0.04 | +0.01 | +0.01 | 0 |
| $(V_{+3} + V_1)(-1)$ | -0.33 | -0.28 | -0.2 | -0.15 | -0.15 | -0.17 | -0.17 | -0.12 | -0.04 | +0.01 | +0.01 | 0 |
| | 1.6 | 1.6 | 1.65 | 1.45 | 1.05 | 0.55 | 0.15 | -0.05 | -0.05 | 0 | 0 | 0 |
| $V_0$ | -1.27 | -1.37 | -1.45 | -1.3 | -0.9 | -0.38 | +0.02 | +0.17 | +0.09 | -0.01 | -0.01 | 0 |
| $\Delta = 0$ | 1.28 | 1.28 | 1.36 | 1.36 | 0.96 | 0.32 | -0.08 | -0.08 | 0 | 0 | 0 | |
| $\Sigma = 1.6$ | 0.01 | -0.09 | -0.09 | 0.06 | 0.06 | -0.06 | -0.06 | -0.09 | -0.09 | -0.01 | -0.01 | 0 |
| $\Delta$ IRE | 0.625 | -5.625 | -5.625 | 3.75 | 3.75 | -3.75 | -3.75 | -5.625 | +5.625 | -0.625 | -0.625 | 0 |

RESIDUES: DOT LEVEL IN Y PATH (IRE UNITS FOR 100% TRANSITION)
$\Sigma$ WEIGHTING FACTOR = $0.8 + (2 \times 0.5) - (2 \times 0.1) = 1.6$ FIG. 9   SUBCARRIER DOT PATTERN RESIDUES IN LUMINANCE PATH AT A CHROMA VERTICAL TRANSITION OF 100 IRE UNITS 6H ENCODER + 2H DECODER ON-SCREEN APPEARANCE OF SUBCARRIER DOT RESIDUES AT
CHROMA TRANSITIONS WITH 6H ENCODER AND 2H DECODER

ADAPTIVE COMB FILTER FOR QUADRATURE MODULATED COLOR TELEVISION SYSTEMS

RELATED APPLICATION

The present application is a continuation of U.S. patent application Ser. No. 087,614, filed on Aug. 20, 1987, now abandoned, which is a continuation of U.S. patent application Ser. No. 785,880, filed on Oct. 9, 1985, now abandoned.

FIELD OF THE INVENTION

The present invention relates to method and apparatus for processing quadrature modulated color television picture signals. More particularly, the present invention relates to a method and apparatus for preventing cross-color and cross-luminance patterns and artifacts otherwise generated during the encoding process in quadrature modulated color television signals following formats such as NTSC and PAL.

BACKGROUND OF THE INVENTION

The basic concept underlying PAL and NTSC format quadrature-modulated color television systems is that the same frequency spectrum is shared by chroma and luminance information (FIG. 1).

For the sake of simplicity, the following presentation is limited to the NTSC color signal format, since it is well understood in the art that the principles hereof apply with like force and result in systems following the PAL signal format.

A typical NTSC encoder is represented by the FIG. 2 block diagram. The FIG. 2 block diagram shows a conventional encoder 10, typically found in association with a color television camera at the studio, or elsewhere. Red (R), Green (G) (sometimes also used directly for the luminance channel) and Blue (B) scanned picture components enter the encoder 10 on R, G and B lines from the camera (not shown). These three components pass through a luminance (Y) matrix 12, an I color component matrix 14, and a Q color component matrix 16. The Y matrix 12 puts out the luminance component Y.

The I color component is passed through a low pass filter 18 having a 6 db cutoff at 1.3 MHz; and the Q color component is passed through a low pass filter 20 having a 6 db cutoff at 0.6 MHz. The filters 18, 20 thereby have the effect of band limiting the I and Q color components. These components enter a quadrature modulator 22 wherein they double sideband amplitude modulate in phase quadrature a color subcarrier (e.g. 3.579545 MHz in NTSC format) which is itself suppressed in level in the modulation process. The subcarrier frequency is selected in such a way as to result in a 180° phase shift from scanning line to adjacent scanning line, and from frame to frame, within the color television picture signal. A burst flag is also added at the quadrature modulator 22.

The luminance signal from the matrix 12 is combined with the quadrature modulated color signal from the modulator 22 in an adder circuit 24 in which synchronization signals such as horizontal and vertical sync, blanking, pedestal, etc. are also added. The resultant composite color signal is low pass filtered in a filter 26 having a 6 db rolloff at 4.2 MHz in order to meet the NTSC signal format standard.

A detailed examination of the frequency spectrum of an NTSC encoded color picture signal in the vicinity of the subcarrier shows the well-known "interleaving" principle (FIG. 3). Spectral rays of a typical television scene are grouped around multiples of Fh (where Fh=horizontal scanning frequency) for the luminance information, while chroma components are grouped around $$\frac{2n+1}{2} Fh$$

(where n is an integral number). This grouping is a particularly accurate representation of the spectral appearance of vertical components of the picture, and enables separation of chroma and luminance at the receiver to be accomplished by use of a comb filter with a fair degree of discrimination between these two components.

Thus, FIG. 3 illustrates the conventionally encountered spectral overlap between the luminance and the chroma components located in the spectrum of the composite picture signal put out by the FIG. 2 encoder 10 at the vicinity of the color subcarrier. Substantial spectral overlap is apparent in the FIG. 3 graph and results from imperfect interleaving of the luminance and chrominance spectral components at the vicinity of the subcarrier frequency.

Unfortunately, the frequency interleaving is perfect only in the case of horizontal transitions in the picture. Diagonal and vertical transitions in the picture image manifest an undesirable overlap of chroma and luminance spectra as illustrated in FIG. 3; and, the separation of the luminance and chroma components in the receiver becomes difficult and in some cases, impossible at such transitions.

As a result of imperfect separation of luminance and chroma components at the encoding process, certain luminance components will be misunderstood by the receiver's decoder and decoded as color. This mistake results in the well known "cross-color" pattern which is typically perceived as a moving rainbow accompanying diagonal luminance transitions, or color activity associated with luminance details.

Certain chroma components will also be misunderstood by the decoder and decoded as luminance. One or two lines of dots at the 3.58 MHz color subcarrier frequency will be perceptibly present in the luminance path for horizontal chroma transitions with comb filter decoders. A decoder using a 3.58 MHz trap in the luminance path exhibits either a poor frequency response, or a vertical dot pattern with vertical chroma transitions, or both.

Complex decoding techniques using adaptive methods (that is, methods which change the structure of a chroma/luminance separator as a function of the image content) reduce the visual impact of these errors, but circuit implementations of these techniques are costly, and there are always picture conditions where practical limits are reached.

While comb filter structures are known and widely utilized in the prior art, a hitherto unsolved need has remained for practical applications of comb filter structures in the encoding process of conventional quadrature modulated color television systems, such as the NTSC system, and in the decoding process in order to prevent unwanted cross-color and cross-luminance artifacts in the resultant picture display.

SUMMARY OF THE INVENTION WITH OBJECTS

A general object of the present invention is to prevent cross-color and cross-luminance patterns in quadrature modulated color television picture displays in a way which overcomes limitations and drawbacks of the prior art.

A specific object of the present invention is to prevent the occurence of cross-color and cross-luminance by adaptively allocating different spectral areas to luminace and chroma components at the encoding process, thereby simplifying separation of chroma and luminance components at the decode/display process.

A further object of the present invention is to reduce chroma/luminance spectral overlap in the color encoder, thereby enabling a more effective separation of these components in a low cost, simplified comb-filter-based decoder.

Another object of the present invention is to provide improved encoding methods and apparatus for quadrature modulated color television picture signals which enables the use of low cost comb filter based decoding methods and apparatus, with the overall result that chroma/luminance spectral overlap in the resultant color television picture signal is greatly reduced or eliminated entirely.

In accordance with the present invention, a method for processing a color television picture signal including a luminance component and a color component which is amplitude modulated in phase quadrature upon a suppressed subcarrier, to reduce cross-color and cross-luminance artifacts in a resultant signal, includes the steps of:

comb filtering the quadrature modulated color component in a comb filter structure having a spectral overlap adaptive number of relevant period delays, whether line or frame, to put out a comb filtered chroma component;

processing the luminance component by passing the luminance component through two complementary filters both symmetrically centered about a color component subcarrier frequency, one filter comprising a band pass filter and the other filter comprising a band reject filter; comb filtering the luminance signal passing through the band pass filter in a comb filter structure having a spectral overlap adaptive number of relevant period delays, whether line or frame; and adding in phase the comb filtered luminance signal and the signal passing through the band reject filter in order to provide a comb filtered full bandwidth luminance signal; and, combining in phase the comb filtered chroma component and the comb filtered full bandwidth luminance signal in order to provide the resultant signal.

As an aspect of the present invention the step of comb filtering of the quadrature modulated color component effectively reduces spectral overlap with the interleaved luminance signal and the step of comb filtering of the luminance signal effectively reduces spectral overlap with the interleaved color component.

An aspect of the present invention is to choose to process through an adaptive comb filter only one of the two signals constituting the composite video, namely luminance or chroma, at the exclusion of the other in order to reduce cost during the encoding process.

Another aspect of this invention is to make use of the bi-dimensional comb filter described in applicant's co-pending patent application Ser. No. 785,881, filed on Oct. 9, 1985, now abandoned, in the luminance path, the chroma path, or both during encode and decode processes within the television system.

The foregoing and other objects, advantages and features of the present invention will be further understood and appreciated by those skilled in the art from consideration of the following detailed description of a preferred embodiment, presented in conjunction with the accompanying drawings.

BRIEF DESCRIPTION OF THE DRAWINGS

In the Drawings:

FIG. 8 graphs the operation of the comb filter depicted in FIG. 4E upon chroma vertical transitions.

FIG. 9 sets forth a table of measured values of subcarrier dot pattern residues in the luminance path at a chroma vertical transition of 100 IRE units in a system employing a 6H delay comb filter based encoder and a low cost 2H delay comb filter based encoder.

FIG. 18 is a block diagram of an adaptive luminance comb filter which switches between a two-line delay structure and a six-line delay structure in relation to the amount of spectral overlap.

DETAILED DESCRIPTION OF A PREFERRED EMBODIMENT

The present invention is best understood against the background of conventional NTSC encoding techniques discussed above under the section entitled "Background of the Invention" which describes the nature and drawbacks of spectral overlap of chroma and luminance information at the vicinity of the color subcarrier frequency.

Figure 4:
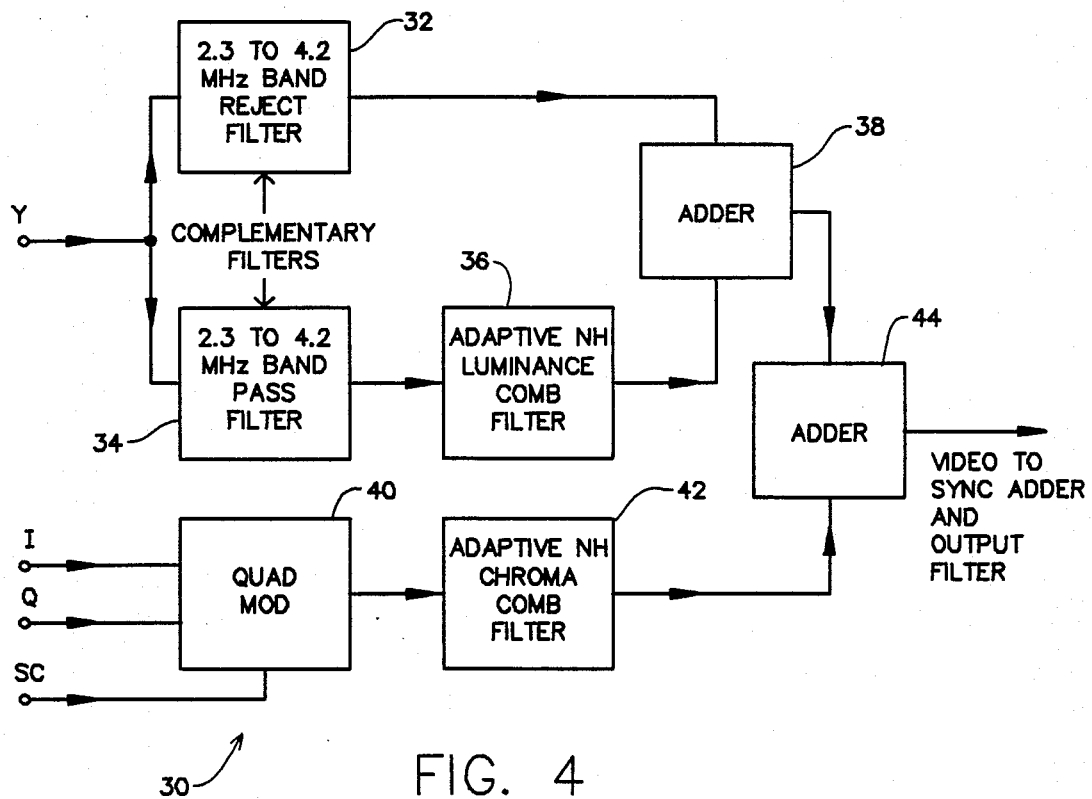
FIG. 4 is a block diagram of an encoder operating in accordance with the principles of the present invention for encoding a color television picture signal in accordance with the NTSC format in a manner which reduces unwanted cross-color and cross-luminance picture artifacts resulting from spectral overlap.

Significant reduction of spectral overlap is achieved with the encoder depicted in FIG. 4. Therein, an encoder 30 includes a luminance signal path and a color component signal path. The Y, I and Q components already have been encoded by appropriate matrix operation which may be the same as performed in the FIG. 2 encoder 10.

The luminance (Y) enters two complementary (inversely symmetrical) filters, a band reject filter 32 and a band pass filter 34. In this NTSC example, the filters 32 and 34 have band reject/pass between 2.3 and 4.2 MHz respectively.

The signal put out by the band pass filter 34 is subjected to comb filtering in a luminance comb filter 36. The luminance comb filter 36 is in accordance with the principles of the present invention and provides reduction of spectral overlap as a function of line delay: the greater the integral number of line delays carried out by the filter, the greater the reduction of resultant spectral overlap. At least a 2H delay comb filter structure, as illustrated in FIG. 4A, is desired for the luminance comb filter 36.

Figure 4A:
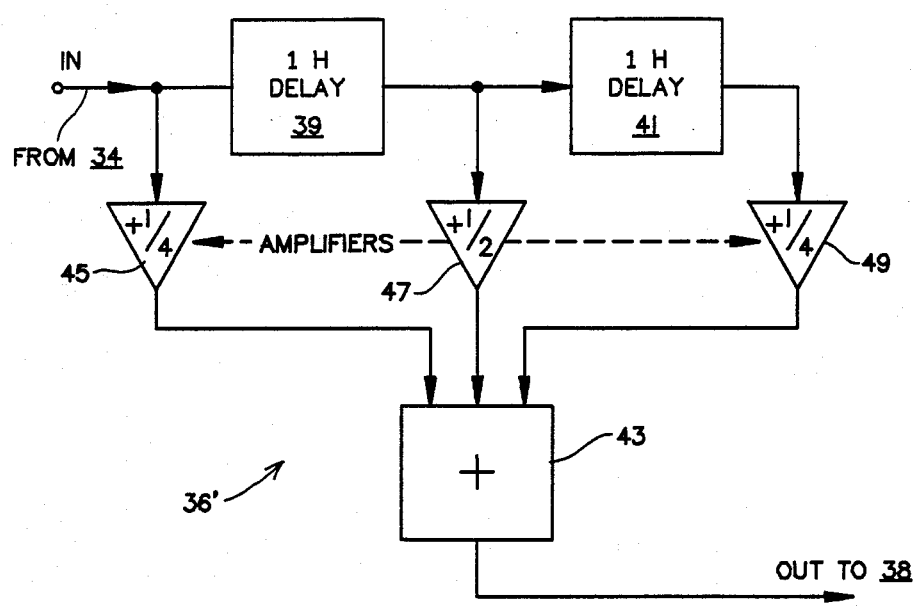
FIG. 4A is a block diagram of a 2H comb filter structure for use in a luminance path within the encoder depicted in FIG. 4.

The 2H delay comb filter structure 36' illustrated in FIG. 4A includes an input leading from the bandpass filter 34 and a train of two series connected single scan line period (1H) delays 39 and 41. Signals taken from the input and outputs of the delays 39 and 41 lead to a combiner circuit 43, with the input component amplified in an amplifier 45 by a fractional one quarter value, the 1H delayed component from the output of the delay 39 amplified in an amplifier 47 by a fractional one half value, and the 2H delayed component from the output of the delay 41 amplified in an amplifier 49 by a fractional one quarter value.

Figure 4B:
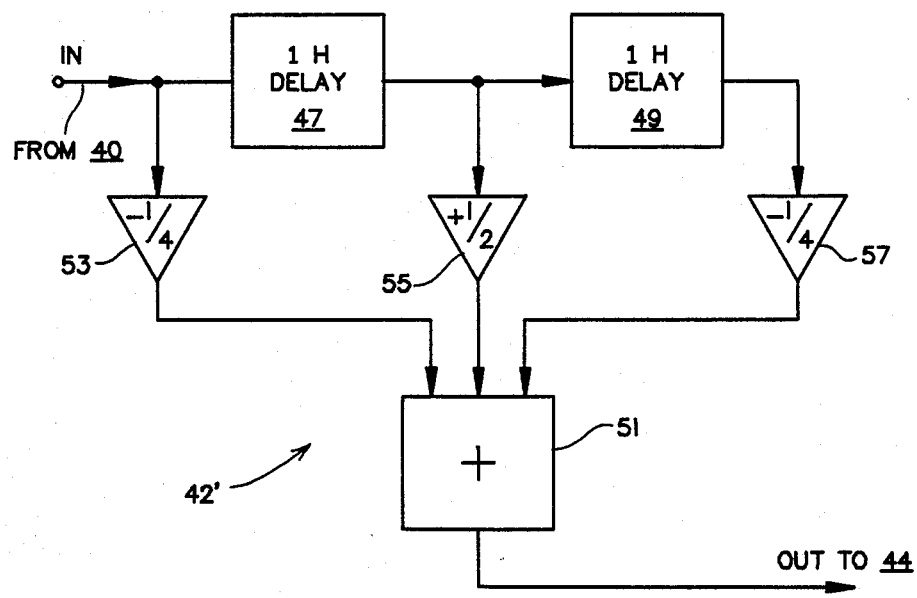
FIG. 4B is a block diagram of a 2H comb filter structure for use in a chrominance path within the encoder depicted in FIG. 4.
Figure 4C:
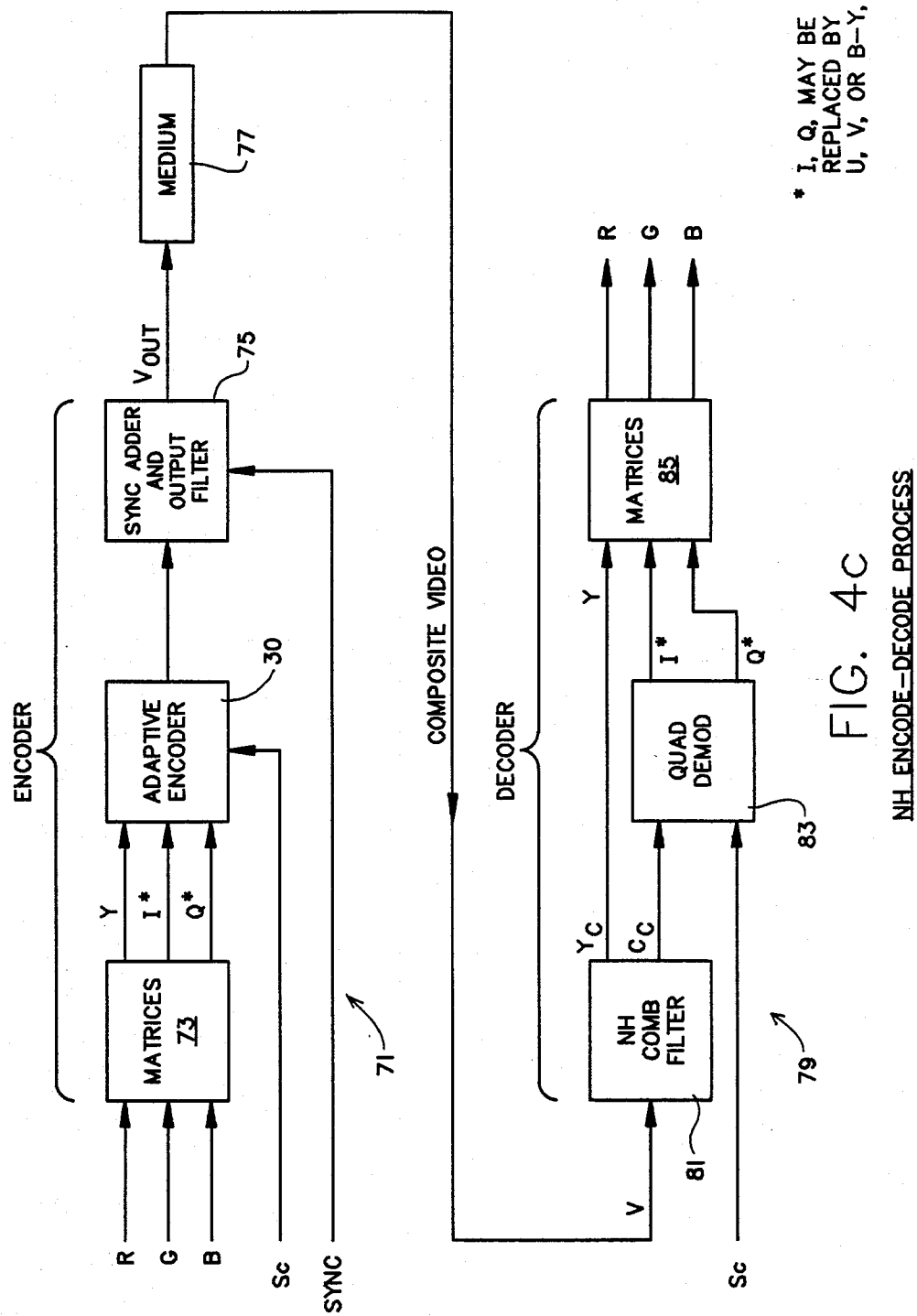
FIG. 4C is a block diagram of a color television picture signal system showing NH encode and decode processes in accordance with the principles of the present invention.
Figure 4D:
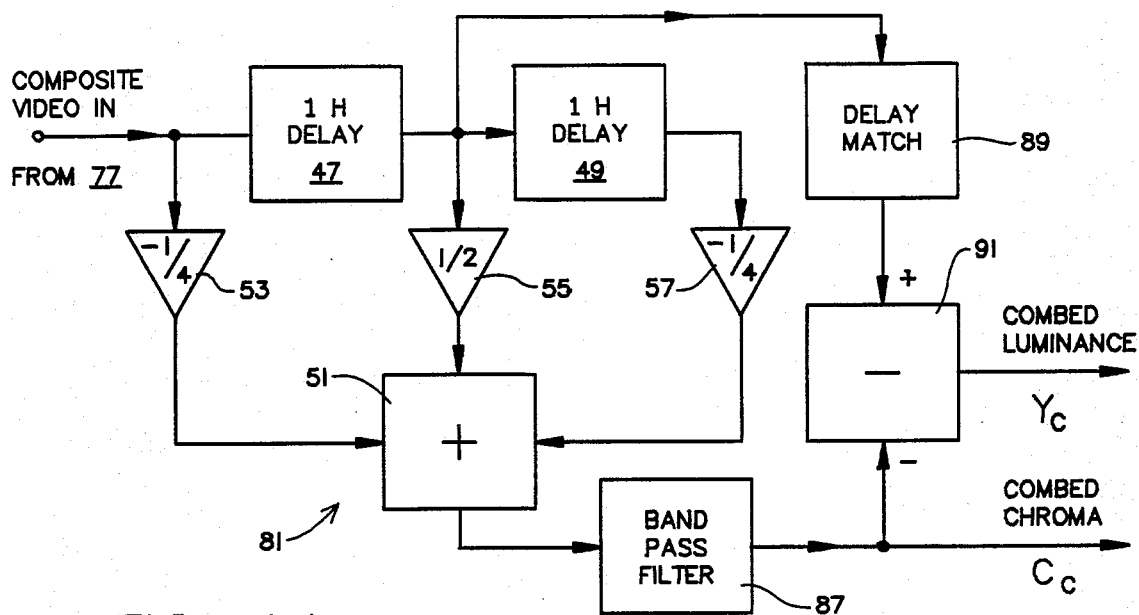
FIG. 4D is a block diagram of a 2H comb filter decoder element depicted in the decode process portion of FIG. 4C for inclusion within a low cost consumer color television display device, for example.
Figure 4E:
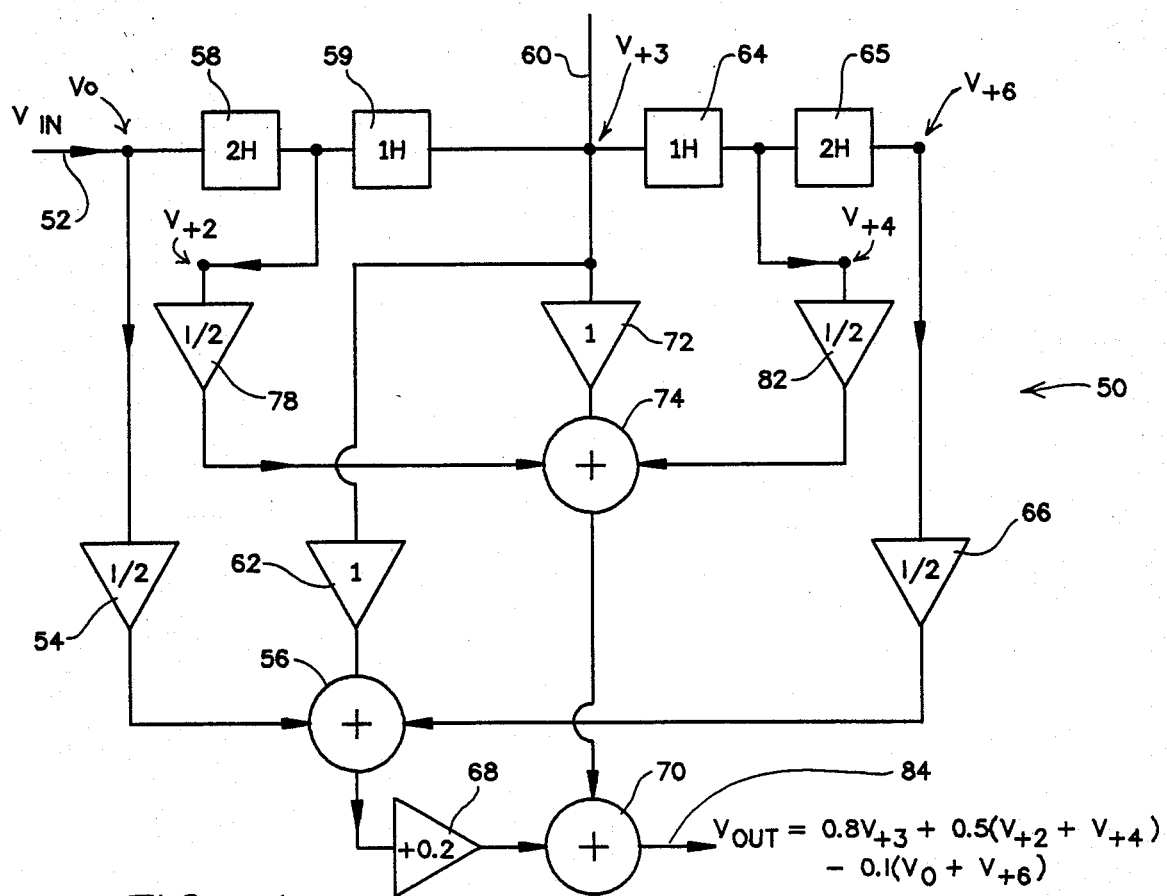
FIG. 4E is a block diagram of a comb filter in which the delay structure is six lines (6H), for example.

A 6H delay luminance component comb filter, by way of further example, is shown in FIG. 4E and is discussed subsequently.

The components of luminance which have been subcarrier region band rejected by the filter 32 and comb filtered in the subcarrier region are combined in a first adder circuit 38 to provide a processed luminance component which has been effectively comb filtered in the subcarrier region.

The I and Q chroma components are quadrature modulated in a quadrature modulator 40 which operates in the same manner as the quadrature modulator 22 of the conventional encoder 10. Then, the color subcarrier put out by the modulator 40 is subjected to comb filtering by a comb filter 42, which is in concept the same as the comb filter 36 which is used to process the luminance component in the vicinity of the subcarrier frequency.

A 2H delay comb filter structure 42', as illustrated in FIG. 4B is desired for the chrominance comb filter 42. The 2H chrominance component comb filter 42' illustrated in FIG. 4B includes an input from the quadrature modulator 40 enters a train of two series connected 1H delays 47 and 49. Signals taken from the input and outputs of the delays 47 and 49 lead to a combiner circuit 51, with the input component amplified in an inverting amplifier 53 by a fractional minus one quarter value, the 1H delayed component from the output of the delay 47 amplified in an amplifier 55 by a frictional one half value, and the 2H delayed component from the output of the delay 49 amplified in an inverting amplifier 49 by a fractional minus one quarter value.

The comb filtered color subcarrier is then combined with the luminance from the first adder 38 in a second adder 44 to provide a color video signal characterized by reduction in spectral overlap in accordance with the principles of the present invention.

Figure 1:
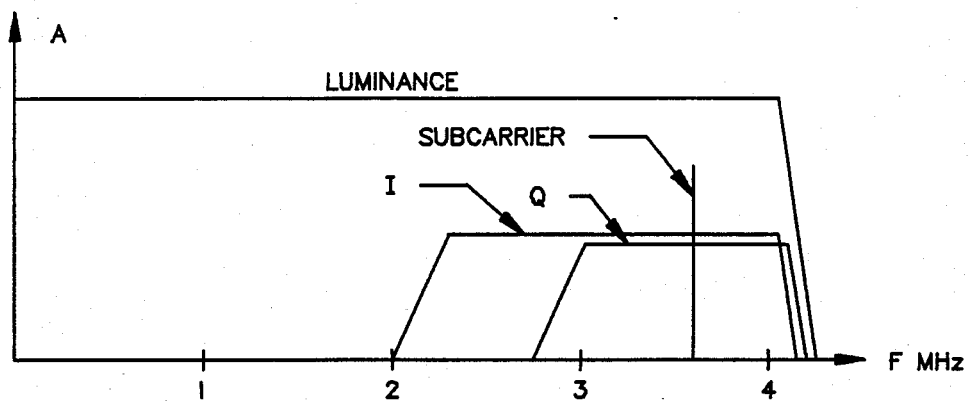
FIG. 1 is a graph of the frequency spectrum occupied by a typical quadrature modulated color television picture signal in accordance with the NTSC format.
Figure 2:
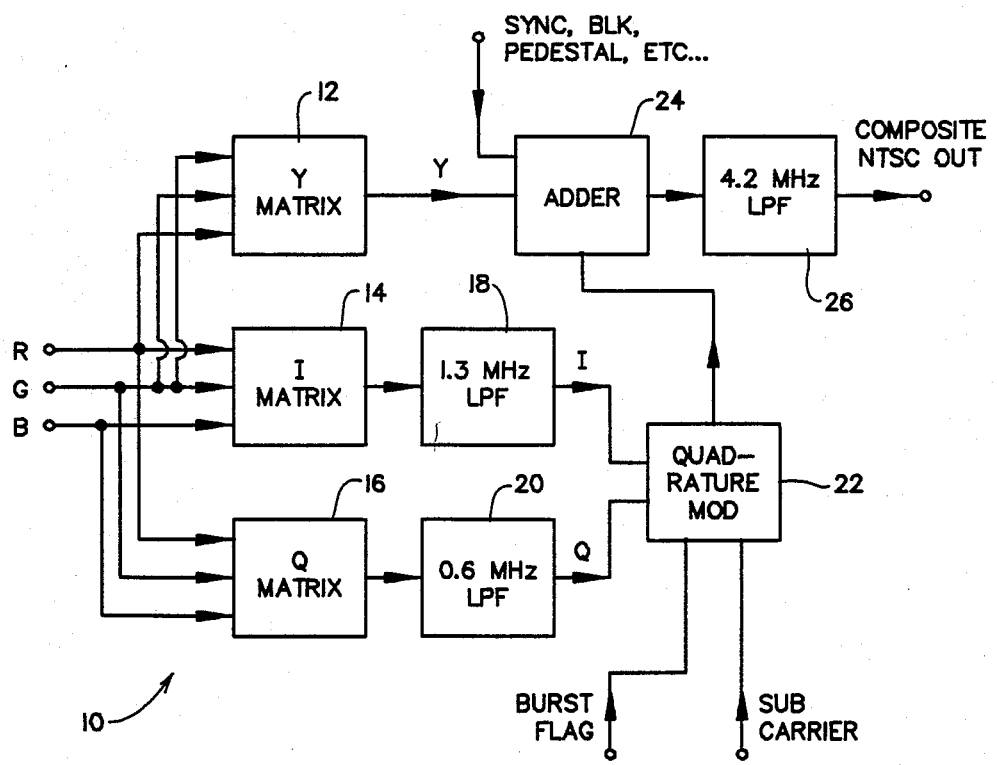
FIG. 2 is a block diagram of a conventional prior art encoder for encoding a color television picture signal in accordance with the NTSC format.
Figure 3:
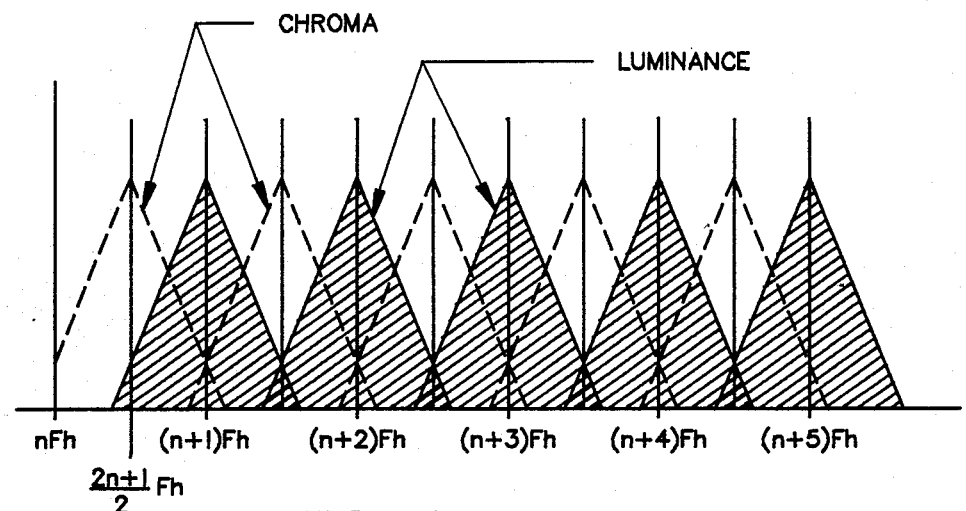
FIG. 3 is a greatly enlarged graph of a portion of frequency spectrum occupied by a typical quadrature modulated NTSC color television picture signal in the vicinity of the subcarrier frequency resulting from operation of a conventional prior art encoder, such as the encoder 10 illustrated in, and discussed above in conjunction with, FIG. 2.

The essential differences between the encoders of FIG. 2 and FIG. 4 are the adaptive line period delay chroma and luminance comb filters 42 and 36 utilized in the FIG. 4 encoder 30, in order to eliminate luminance spectral components susceptible to be added to chroma areas, and chroma spectral components susceptible to be added to luminance components in spectral areas reserved to luminance.

FIG. 4C depicts a color television system which includes encode/decode processes in accordance with the present invention. An encoder portion 71 includes color encoding matrices 71 which may be the Y, I and Q matrices 12, 14, 16 depicted in FIG. 2. An NH period encoder such as the encoder 30 shown in and discussed in connection with FIG. 4 receives Y, I and Q information from the matrices 73 and encodes these signals with comb filter processing in a manner previously described. An output video signal is then sent through a path or medium 77. It may be a broadcast or closed circuit cable television path, or it may be a storage medium, such as videotape.

Composite video exiting the path or medium 77 enters a decode portion 79 of the FIG. 4C process. A fixed delay NH period comb filter structure 81 shown and discussed in FIG. 4D separates the composite signal into combed chrominance Cc and combed luminance Yc. The combed chrominance is demodulated in a conventional chroma demodulator circuit 83, to produce color difference signals I and Q, and the decoded combed luminance Yc and combed I and Q chroma difference signals are then decoded by conventional decode matrices 85 into red (R), green (G) and blue (B) signals for display e.g. on a conventional picture tube (not shown).

FIG. 4D illustrates a 2H period comb filter decoder structure 81' for the NH comb filter 81 depicted in FIG. 4C. The comb filter 81' is configured to separate chrominance by comb filtering, and is therefore virtually the same structure as previously depicted in FIG. 4B with the addition of a band pass filter 87, delay matching circuit 89 and difference circuit 91 in which combed chrominance Cc is subtracted from composite video in order to yield combed luminance Yc.

The construction of a comb filter adapted to possess characteristics to reduce spectral overlap in an encoding process is illustrated in FIG. 4E. which depicts a 6H comb filter 50. The filter 50 includes a Vin input node 52 (V0) which divides into two paths, a first path through a one half amplitude gain amplifier 54 to a first summing junction 56; and, a second path through a 2H delay line 58 to provide a V2 component and a 1H delay line 59 provide a V3 node 60. The V3 component passes through a unity gain amplifier 62 to the first summing junction 56. The V3 component also passes through a 1H delay line 64 and a 2H delay line 65 to provide a V6 node. The V6 component then passes through a one half amplitude gain amplifier 66 to the first summing junction 56. The output of the first summing junction 56 is amplified in a two tenths amplitude gain amplifier 68 and passed into a second summing junction 70 as one input thereto.

The V3 component is also passed through a unit gain amplifier 72 to a third summing junction 74. The V2 component is also passed through a one half amplitude gain amplifier 78 to the third summing junction 74. Finally, the V3 component is passed through a one half amplitude gain amplifier 82 to the third summing junction 74.

With reference to FIGS. 4E and 8, the Vin signal is labelled V0, the signal at the node 60 is labelled V+3, the signal put out by the delay line 65 is labelled V+6. The signal put out by the 2H delay line 56 is labelled V+2, and the signal put out by the +1H delay line 64 is labelled V+4.

The output from the third summing junction 74 provides a second input to the second summing junction 70, and the resultant signal Vout put out at an output 84 by the junction 70 has the function:

Vout=0.8V+3+0.5(V+2+V+4)−0.1(0V+V+-6).

By way of further technical explanation of the operation of the 6H comb filter 50 depicted in FIG. 8, the 3rd harmonic of a square wave fundamental frequency is added at a −14 db level to the fundamental frequency. Delays which are multiple of TH $$\left( \text{scanning period } Th = \frac{1}{fh} \text{ frequency} \right)$$

are combined to obtain the proper vertical response.

Figure 4F:
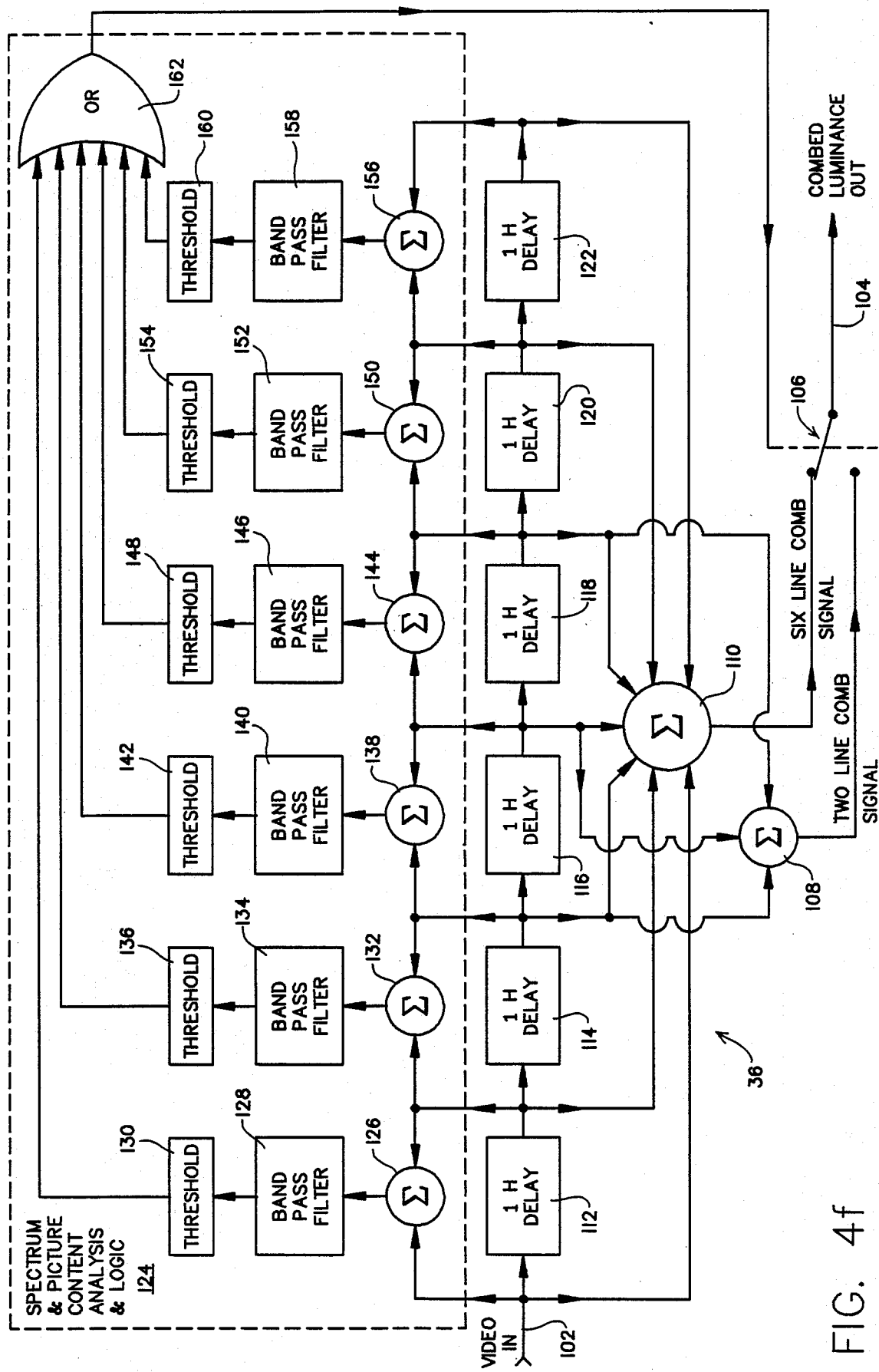
FIG. 4F is a block diagram of an adaptive luminance comb filter which switches between a two-line (2H) delay structure and a six-line (6H) delay structure in relation to the amount of spectral overlap.

FIG. 4F illustrates the adaptive NH luminance comb filter 36 within the FIG. 4 encoder 30. The adaptive filter 36 normally follows the FIG. 4A 2H delay structure, and adaptively switches to an NH comb structure, such as the FIG. 4E 6H delay structure when chrominance/luminance overlap is heavy. The filter 36 includes an input 102, an output 104, a switch 106, a 2H delay comb filter summing junction 108 and a 6H delay comb filter summing junction 110. For example, the 2H comb filter structure may be a subset of the 6H delay comb filter structure. 1H delays 112, 114, 116, 118, 120 and 122 are connected in tandem. A spectrum and picture content analysis logic circuit 124 determines whether the chrominance/luminance overlap is above a certain level and operates the switch 106 accordingly. For example, the logic 124 may be implemented as shown in FIG. 4F as arrays which are attached across each one of the delay lines for summing one-line-delayed video, filtering the sum at the vicinity of the chroma subcarrier and passing the resultant through an overlap threshold setting circuit. An array for the delay 112 includes a summing junction 126, a band pass filter 128 and a threshold circuit 130; an array for the delay 114 includes a junction 132, a filter 134 and a threshold 136; an array for the delay 116 includes a junction 138, a filter 140 and a threshold 142; an array for the delay 118 includes a junction 144, a filter 146 and a threshold 148; an array for the filter 120 includes a junction 150, a filter 152, and a threshold 154; and, an array for the filter 122 includes a junction 156, a filter 158 and a threshold circuit 160. An OR gate 162 selects any one of the above-threshold values put out by the threshold circuits and operates the switch 106 to switch adaptively from a 2H delay structure to a 6H delay structure in the presence of chrominance/luminance spectral overlap above a predetermined level. While a 6H delay structure is shown in FIG. 4F, sequential line delays of up to 13H are easily obtained when the luminance comb filter structure 36 is implemented digitally. Thus, the encoder comb filter structure 30 may adaptively achieve the characteristics graphed as FIG. 5C in order to provide effective elimination of chrominance/luminance spectral overlap. Also, while the adaptive filter 36 is shown for the luminance path, the FIG. 4F structure may be readily adapted to provide the adaptive NH chrominance comb filter 42.

Figure 5:
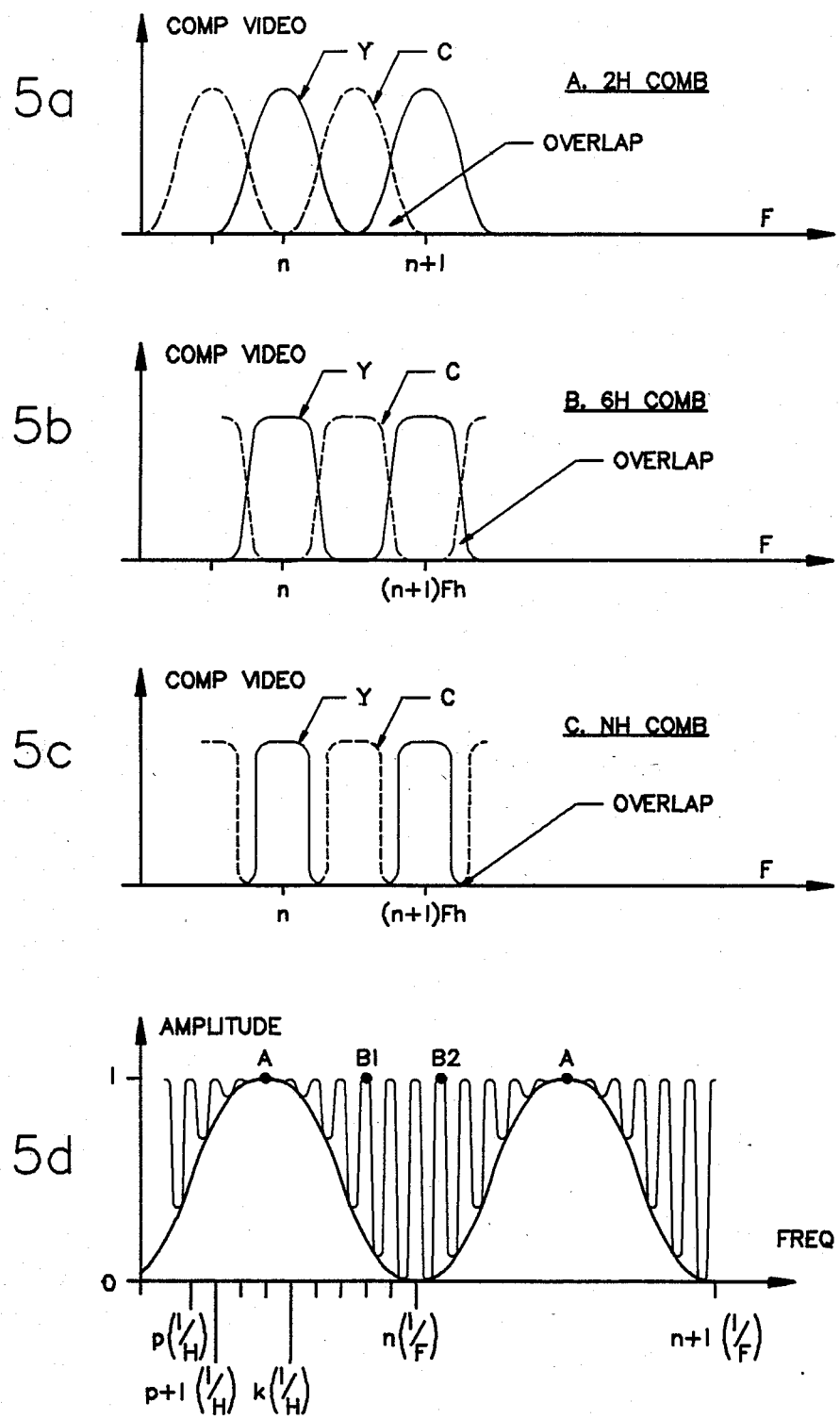
FIGS. 5A, 5B, 5C, and 5D graph the frequency responses of four different comb filter structures in an encoder in order to show that as the number of picture line delays provided for comb filtering increases, the amount of spectral overlap between luminance and chroma components decreases for 5A, 5B and 5C, and is virtually eliminated if frame memories are also used (FIG. 5D).

Responses such as those represented in FIG. 5C eliminate all overlap, but require more delay (up to 13H). It is to be noted, however, that these delays are easily obtained if comb filtering operations are carried out in the digital domain.

The results of the introduction of spectral separation of Y and C components by comb filtering techniques prior to encoding is represented in FIGS. 6, 7, 9 and 10.

Figure 6:
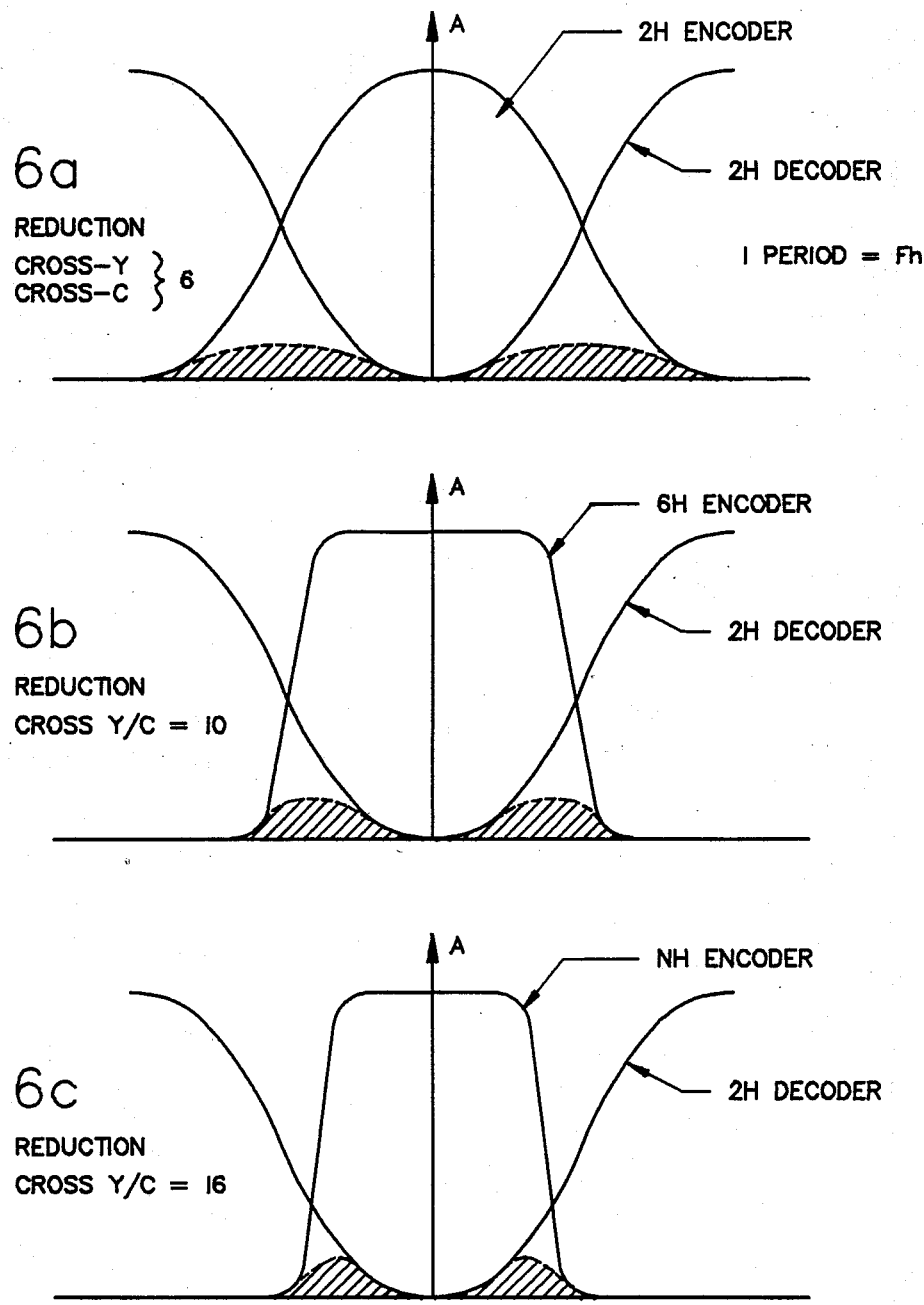
FIGS. 6A, 6B and 6C graph the reduction in spectral overlap of a color television system employing a 2H comb filter decoder as the number of picture line delays provided for comb filtering in the encoder increases.
Figure 7:
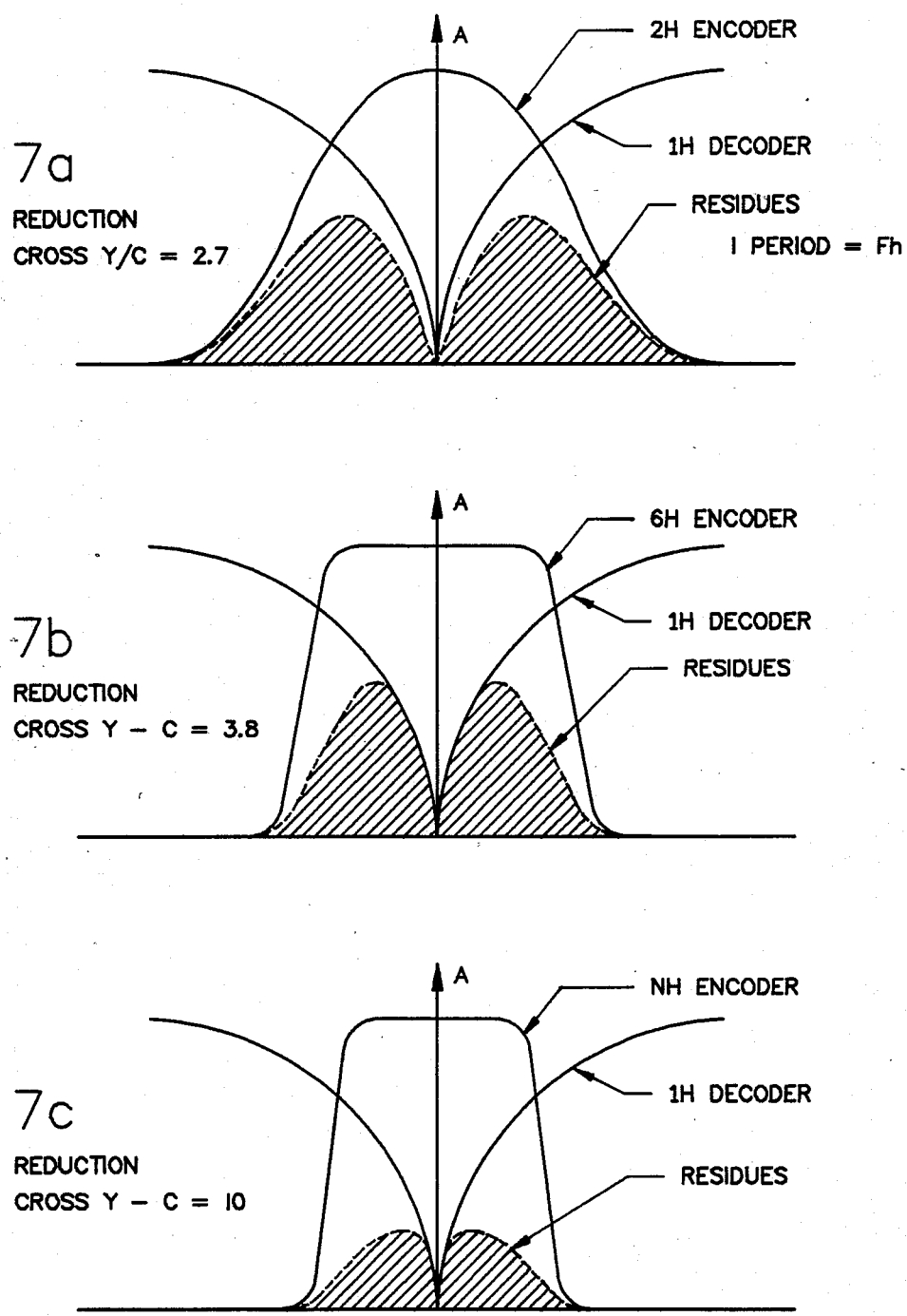
FIGS. 7A, 7B and 7C graph the reduction in spectral overlap of a color television system employing a 1H comb filter decoder as the number of picture line delays provided for comb filtering in the encoder increases.

FIG. 6 indicates the reduction of cross-color and cross-luminance interferences at the output of a low cost 2H comb decoder. Reductions varying between 7 and 16 are obtained with the FIG. 4 encoder 30 in comparison with the conventional encoder 10 of FIG. 2, while a simple 1H comb filter based decoder shows reductions varying between 2.7 and 10.

Figure 10:
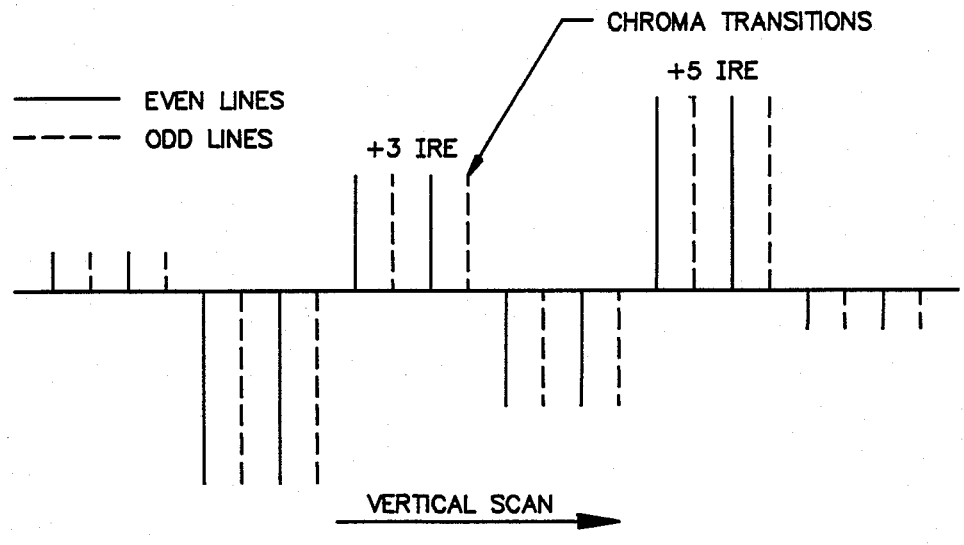
FIG. 10 graphs the on-screen appearance of subcarrier dot pattern residues at chroma transitions with a 6H comb filter based encoder and a 2H comb filter based decoder.

FIGS. 9 and 10 show the luminance subcarrier dot pattern residues accompanying the use of a 6H-comb structure in the encoder and of a 2H comb in the decoder for 100 IRE units.

The dot residues do not exceed 6 IRE units, which is below the threshold of visibility; without a comb filter in the encoder, the dot residues would be 50 IRE units, and adaptive features would be required in the decoder.

In effect, by transfering the complexity of signal processing to the encoder side of the signal distribution system (i.e. television studio) the present invention enables the use of very simple decoders in low-cost receivers to achieve superior pictures without unwanted dots or cross-color pattern artifacts, as shown in FIG. 4C system block diagram.

However, comb filters which operate strictly within a picture frame (that is, using delays of few scanning lines only), whether used in the encoder, the decoder, or both, have two inherent defects, minor but noticeable for very demanding applications. These defects are: loss of luminance diagonal resolution and loss of chroma vertical resolution.

These defects are completely eliminated if the bidimensional filters are used both in the encoder and in the decoder processes of a system. With these filters, stationary pictures do not suffer any loss of diagonal luminance or chroma vertical resolution. These losses only occur for moving material, and are then hidden in all cases by the motion. There are virtually no cross-color or cross-luminance patterns in that configuration.

The performance of such a filter are better visualized on FIG. 5D which represents the frequency response of the filter. Point A corresponds to the location of stationary objects and the input signal appears unfiltered at the output. Points B1 and B2 correspond to the locations of moving objects, whose spectrum falls in the area where a 2H type comb filtering takes place.

In summary, the use of bi-dimensional comb filters in the encoder and in the decoder results in a picture free of cross-color, cross-luminance, motion problems and resolution losses. The use of these techniques in the encoder alone results into significant improvements even if a simpler decoder is being used at the receive/display end of the signal path.

OTHER CONSIDERATIONS (1) When using comb filters in encoders, the demodulated chroma signal to noise ratio is very significantly improved by the elimination of a large portion of the chroma noise otherwise transferred from the luminance channels into chroma by operation of conventional encoders, since luminance noise at 3.58 MHz is considerably higher than under 1.3 MHz (triangular camera noise).

(2) The inventive approach described herein is applicable to PAL and to a certain extent, to SECAM. The case of PAL is directly extrapolated from NTSC by replacing H and F delays (NTSC) by 2H and 2F (PAL).

(3) Adaptive techniques may be used in the encoder comb filters; when one expects a heavy amount of overlap, the system may switch to the case of FIG. 5C, while most of the time following the structure of 5a or 5b.

(4) These methods result in a fully compatible NTSC or PAL signal in full compliance with FCC or EBU regulations. If, however, regulations were slightly modified to reduce the chroma bandwidths (I, Q, u, v) below 1 MHz, comb filter performance would be greatly increased; low cost circuit implementations would be practical; spectral overlap at diagonal transitions would be reduced; and, chroma transitions would not be significantly degraded.

(50) Other techniques may be used concurrently with the proposed approach presented here. These are:
(a) Chroma enhancement by luminance transitions (e.g. U.S. Pat. No. 4,030,121).
(b) Luminance enhancement by luminance components (also e.g. U.S. Pat. No. 4,030,121) made more efficient now by starting with a clean 4.2 MHz bandwidth free of chroma residues.
(c) Chroma vertical enhancement by luminance transitions (e.g. U.S. Pat. No. 4,240,105).
(d) Chroma/luminance separation gamma error correction (Schaffer, "High Definition Television Production Standard", *SMPTE Journal*, July 1985, p. 749).
(e) Double rate scanning and Nyquist vertical pre-filtering (Wenland, Darmstadt University work).
(f) Inter-dimensional chroma-noise reduction system (e.g. U.S. Pat. No. 4,670,775).
(g) Progressive scanning at the camera with 2/1 interlace for transmission, and progressive scanning at the receiver.

All these techniques used concurrently would result in an NTSC or PAL picture fully compatible with existing receivers, and showing the following apparent results on specially equipped receivers:
(1) Visual equivalent of 1050 (NTSC) or 1250 lines (PAL) lines scan.
(2) No visible cross-color and cross-luminance patterns.
(3) Apparent 6 MHz Y bandwidth and 3 MHz C bandwidth.
(4) 20 db chroma noise improvement.
(5) No 15 or 12.5 Hz C/Y flicker and "painted" appearance.
(6) Perfectly smooth motion on a 60 Hz or 30 Hz (progressive camera scan) basis.

Applying the techniques described herein (encoder/decoder comb filtering) only in the time domain (frame comb) is not sufficient. Purely temporal comb filters are usually efficient, but collapse in certain picture conditions: motion for large areas, such as an overall pan, would result in either unacceptable cross-color/cross-luminance patterns with conventional encoders or into a bandwidth limited to 2.3 MHz (frame comb filter encoder) and/or a 15 Hz high frequency refresh rate.

A combination line/frame comb in both luminance and chrominance in the encoder, used in relation with a fixed length comb filter structure decoder, for example, shows none of these inconveniences.

While the method and apparatus of the present invention have been summarized and explained by an illustrative application in reduction of cross-color and cross-luminance patterns by use of comb filtering at encoding and decoding of quadrature modulated color television signals, it will be readily apparent to those skilled in the art that many widely varying embodiments and applications are within the teaching and scope of the present invention, and that the examples presented herein are by way of illustration only and should not be construed as limiting the scope of this invention.

I claim:

1. A method for encode-decode processing of a quadrature modulated color television picture signal including a luminance component and a chrominance component which is amplitude modulated in phase quadrature upon a suppressed subcarrier, to reduce cross-color and cross-luminance artifacts in a resultant signal to be displayed, the method including in an encoding process the steps of:

comb filtering the quadrature modulated chrominance component in a comb filter structure including an adaptively selectable number of n delays, where n is equal to an integer lying in a range between 2 and 13 and the delay is a predetermined one of line scan period, frame scan period, and frame/line scan periods, the number n being adaptively selected in relation to chrominance/luminance spectral overlap in an incoming video signal in order to put out a comb filtered chroma component;

processing the luminance component by passing the luminance component through two complementary filters both symmetrically centered about a chrominance component subcarrier frequency, one filter comprising a band pass filter and the other filter comprising a band reject filter; comb filtering the luminance signal passing through the band pass filter in a comb filter structure including an adaptively selectable number of n delays, where n is equal to an integer and the delay is the same predetermined one of line scan period, frame scan period, and frame/line scan periods the number n being adaptively selected in relation to chrominance/luminance spectral overlap in an incoming video signal in order to produce a comb filtered high frequency luminance signal; and adding in phase the comb filtered high frequency luminance signal and the signal passing through the band reject filter in order to provide a comb filtered full bandwidth luminance signal; and, combining in phase the comb filtered chroma component and the comb filtered full bandwidth luminance signal in order to provide a composite signal to a path;

the method including within a decoding process the steps of:

receiving the composite signal from the path;

comb filtering the composite signal received from the path in a comb filter structure including n delays, where n is equal to an integer and the delay period is the same predetermined one of said line scan period, frame scan period, and frame/line scan periods in order to separate a received chrominance component and a received luminance component; and, decoding said comb filter separated chrominance component and said comb filter separated luminance component to recover said resultant signal to be displayed.

2. A method for processing a quadrature modulated color television picture signal including a luminance component and a chrominance component which is amplitude modulated in phase quadrature upon a suppressed subcarrier to reduce cross-color in a resultant signal to be displayed, the method including within an encoding process the steps of:

processing the luminance component by passing the luminance component through two complementary filters both symmetrically centered about a chrominance component subcarrier frequency, one filter comprising a band pass filter and the other filter comprising a band reject filter; comb filtering the luminance signal passing through the band pass filter in a comb filter structure including an adaptively selectable number of n delays, where n is equal to an integer lying in a range between 2 and 13 and the delay is a predetermined one of line scan period, frame scan period, and frame/line scan periods, the number n being adaptively selected in relation to chrominance/luminance spectral overlap in an incoming video signal in order to produce a comb filtered luminance signal; and adding in phase the comb filtered luminance signal and the signal passing through the band reject filter in order to provide a comb filtered full bandwidth luminance signal; and, combining in phase the chrominance component and the comb filtered full bandwidth luminance signal in order to provide a composite signal for transmitting via a path, the method including within a decoding process the steps of:

receiving the composite signal from the path, comb filtering the composite signal received from the path in a comb filter structure including n delays, where n is equal to an integer and the delay period is the same predetermined one of said line scan period, frame scan period, and frame/line scan periods in order to separate a received chrominance component and a received luminance component, and decoding said comb filter separated chrominance component and said comb filter separated luminance component to recover said resultant signal to be displayed.

3. A method for processing a quadrature modulated color television picture signal including a luminance component and a chrominance component which is amplitude modulated in phase quadrature upon a suppressed subcarrier, to reduce cross-luminance artificacts in a resultant signal to be displayed, the method including within an encode process the steps of:

comb filtering the quadrature modulated chrominance component in comb filter structure including n delays, where n is equal to an integer lying in a range between 2 and 13 and the delay period is a predetermined one of said line scan period, frame scan period, and frame/line scan periods, the number n being adaptively selected in relation to chrominance/luminance spectral overlap in an incoming video signal in order to put out a comb filtered chroma component;

combining in phase the comb filtered chroma component and the full bandwidth luminance signal in order to provide a composite signal for transmission through a path, the method including within a decoding process the steps of:

receiving the composite signal from the path, comb filtering the composite signal received from the path in a comb filter structure including n delays, where n is equal to an integer and the delay period is the same predetermined one of said line scan period, frame scan period, and frame/line scan periods in order to separate a received chrominance component and a received luminance component, and decoding said comb filter separated chrominance component and said comb filter separated luminance component to recover said resultant signal to be displayed.

4. A method for processing a quadrature modulated color television picture signal including a luminance component and a chrominance component which is amplitude modulated in phase quadrature upon a suppressed subcarrier, to reduce cross-color and cross-luminance artificacts in a resultant signal, the method including the steps of:

comb filtering the quadrature modulated chrominance component in a comb filter structure including n delays, where n is equal to an integer lying in a range between 2 and 13 and the delay is a predetermined one of line scan period, frame scan period, and frame/line scan periods, the number n being adaptively selected in relation to chrominance/luminance spectral overlap in an incoming video signal in order to put out a comb filtered chroma component;

processing the luminance component by passing the luminance component through two complementary filters both symmetrically centered about a chrominance component subcarrier frequency, one filter comprising a band pass filter and the other filter comprising a band reject filter; comb filtering the luminance signal passing through the band pass filter in a comb filter structure including n delays, where n is equal to an integer lying in a range between 2 and 13 and the delay is the same predetermined one of line scan period, frame scan period, and frame/line scan periods, the number n being adaptively selected in relation to chrominance/luminance spectral overlap in an incoming video signal in order to produce a comb filtered high frequency luminance signal; and adding in phase the comb filtered high frequency luminance signal and the signal passing through the band reject filter in order to provide a comb filtered full bandwidth luminance signal; combining in phase the comb filtered chroma component and the comb filtered full bandwidth luminance signal in order to provide the resultant signal.

5. A processing method as described in claim 4 where the luminance comb filter structure normally employs two scanning line delay periods in processing said luminance components in NTSC format and adaptively switches to six or more scanning line delay periods in instances of heavy overlap of chrominance and luminance components, and said chrominance comb filter structural normally employs two scanning line delay periods in processing said chrominance components in NTSC format and adaptively switches to six or more scanning line delay periods in instances of heavy overlap of chrominance and luminance components.

* * * * *